US006176584B1

United States Patent
Best et al.

(10) Patent No.: US 6,176,584 B1
(45) Date of Patent: Jan. 23, 2001

(54) CURVED SURFACE, REAL IMAGE DOME DISPLAY SYSTEM, USING LASER-BASED REAR PROJECTION

(75) Inventors: Leonard G. Best, Gilbert; Donald R. Wight, Phoenix; Timothy J. Kochert, Gilbert, all of AZ (US)

(73) Assignee: Raytheon Company, Lexington, MA (US)

( * ) Notice: Under 35 U.S.C. 154(b), the term of this patent shall be extended for 0 days.

(21) Appl. No.: 09/493,311

(22) Filed: Jan. 28, 2000

(51) Int. Cl.$^7$ .................................................. G03B 21/26
(52) U.S. Cl. ........................................................ 353/30
(58) Field of Search .............................. 353/28, 94, 30; 352/69, 70; 434/40, 44, 285

(56) References Cited

U.S. PATENT DOCUMENTS

| | | | |
|---|---|---|---|
| 4,656,506 | * 4/1987 | Ritchey | 352/70 |
| 5,023,725 | * 6/1991 | McCutchen | 352/70 |
| 5,433,608 | * 7/1995 | Murray | 434/44 |
| 5,582,518 | * 12/1996 | Henigue et al. | 353/30 |
| 5,860,811 | * 1/1999 | Henderson | 434/40 |

\* cited by examiner

*Primary Examiner*—William C. Dowling
(74) *Attorney, Agent, or Firm*—William C. Schubert; Glenn H. Lenzen, Jr.

(57) ABSTRACT

The present invention is related to a curved surface, real image, laser-based rear projection display system. A plurality of translucent panel members are assembled into a spherical dome assembly. The panels have concave inner surfaces treated with an optical medium to create a diffusion surface onto which the projected visual image is displayed to a design eye point located within the dome. The laser-based projectors have a greatly expanded focal range as compared to conventional sources of illumination. This allows the curved panel members to remain in focus when the dome is moved as much as two (2) relative to the location of the laser projector.

8 Claims, 7 Drawing Sheets

CURVED SURFACE, REAL IMAGE DOME DISPLAY SYSTEM, USING LASER-BASED REAR PROJECTION

RIGHTS OF THE GOVERNMENT

This invention was made with Government support under contract No. F41624-97-D-5000 awarded by the Department of the Air Force. The Government has certain rights in this invention.

BACKGROUND OF THE INVENTION

1. Field of the Invention

The present invention relates to real time, curved surface imaging systems. More particularly, the present invention is directed to a laser-based, rear projector imaging system.

2. Description of the Related Art

Spherical dome imaging systems have long been used in a variety of applications ranging from planetariums and commercial entertainment systems to military flight simulators. Domed imaging visual systems are capable of generating scenes with a high degree of realism because the scene is presented to the view in many directions at once, not just from a single flat plane as in most conventional imaging systems. The capacity for producing a wide field of view is highly desirable in both commercial and military imaging systems applications.

Most conventional dome display systems in use are front projection systems. Like conventional movie theaters, front projection systems employ one or more projectors positioned on the same side of the screen as the viewer and serve to project still and/or moving images onto the screen. On conventional front projection spherical dome displays, it is often necessary to use elaborate mounting mechanisms and costly optical lens arrangements to insure a collect viewing perspective, without interfering with the projected light path. Subtle protrusions of the "rib" structure located on the exterior of the dome are frequently apparent on the interior screen surface. Because the projector and projected light rays are on the same side of the screen as the viewer, physical limitations are imposed which restrict placement and movement of the viewer. When employed in simulation and training systems, the necessity for avoiding occluding projected light rays places severe limitations on training device location and configuration. In domed imaging systems which employ multiple front projectors, the physical limitations may also undesirably restrict the number of projectors and, as a result, the number of images that the system can employ.

Conventional front-projected dome surfaces are often painted with a display screen medium to enhance visibility. This can result in irregularities being visible on the display surface, such as mottling. The viewing dome surface also must have very critical optical characteristics necessary to produce sufficient off-axis luminance. Producing dome screens with these desired optical characteristics is an expensive process requiring specialized talent to produce the required finish.

Another factor which contributes to the complexity and cost of front projection domed imaging systems is the distortions caused by off-axis projection of images onto the curved dome surfaces. Correcting such distortions requires special video projectors capable of performing such corrections. This can increase the cost of the system and require a significant amount of time.

In an effort to overcome the problems associated with front projection systems, some display systems use rear-projection techniques, often referred to as "dome displays". In actuality, such systems are not true spherical dome displays. Rather, they usually employ multi-faceted, flat panel displays, configured with multiple flat panel display screens, specifically designed to encapsulate the viewer. While such systems may provide certain advantages achieved by a true dome display, they lack a key feature of a true spherical dome display. Namely, they do not have true spherical geometry. This can result in undesirable visual irregularities or artifacts when the imaging system is employed within the exacting requirements of military flight simulation or other visually demanding applications. One such artifact is variable eye relief distance. In a true spherical dome display wherein the design eye point is at the center of the sphere, the ideal eye relief distance is equal to all points on the display surface. This is not true when using a flat panel, multi-faceted, dome display. In such flat panel displays, as the viewer's gaze moves away from the line of sight between the design eye point and the screen normal, the eye relief will increase at a rate inversely proportional to the cosine of the angle traversed. In comparison, in a true spherical dome display, the design eye relief remains constant regardless of gaze direction. As can be easily understood, an advantage of a true spherical dome over a multi-faceted, flat panel is the fixed eye relief to all points on the display surface.

When employing conventionally illuminated projectors, i.e. light valve, CRT, LCD and DMD projectors with standard lenses, the projected image size is a function of the projection lens and the throw distance. After the image size has been established, a mechanical focus adjustment procedure is employed to correct for center and off-axis corner focus of the displayed image. The available range of adjustment for off-axis focus depth is very limited. With conventional non-laser light sources, any change of screen position in relation to the position of the projector lens requires re-focusing of the display image. The focus adjustment is within the acceptable range at only a very specific distance between the projector and the display screen. If there is even a slight change in projector throw distance, it is necessary to again perform the focus adjustment procedure. Thus, when employing non-laser projectors, it is usually not possible to focus a display image on a curved dome surface without employing costly special optics to compensate for the curvature of the dome surface.

It is clear that there exists a need in the art for a full field-of-view (FOV), spherical dome display system employing a rear-projection imaging source capable of displaying images in real time on a curved surface of the dome. Such a display system should overcome the problems associated with conventional illumination light sources while being cost efficient. As will become apparent, the present invention meets all of these requirements in a unique dome display system.

SUMMARY OF THE INVENTION

The present invention addresses the need in the art for a true spherical dome imaging system having a FOV limited only by normal cockpit obstructions. The dome imaging system of the present invention employs a rear-projected laser light source with its expanded focal range. The dome structure is fabricated from a plurality of separate, translucent panels including both curved side panels and curved cap panels. The panels are specially molded to serve as display screens with appropriate optical characteristics. The panels are curved and have an optical medium affixed to the concave side to create a diffusion surface onto which the projected visual image is displayed. The optical characteristics of the system direct the displayed image toward the system design eye point.

Each of the curved panels has an outer edge formed as an upturned flange. When assembled, the flange portions of adjacent panels make surface contact with one another and are clamped together to create a substantially spherical dome structure. Because the curved panels form a translucent dome, the concave inner surface of each panel serves as a screen for displaying to a viewer positioned in the dome a real time display image projected through the dome by a rear-projector. The assembled dome imaging system achieves a full 360° horizontal FOV and a total vertical FOV of approximately 130°, of which, approximately 70° is provided by the side panels.

The rear-projection system of the present invention employs at least one laser-based projector to illuminate each dome panel. By using a laser-based rear projection system, the resulting display images on the dome panels will have significantly improved resolution, brightness and contrast compared to conventional flat panel, multi-faceted displays. Finally, by employing a true spherical dome, the benefits associated with a spherical dome are assured.

DESCRIPTION OF THE INVENTION

Illustrative embodiments and exemplary applications are described below with reference to the accompanying drawings in order to disclose the advantageous teachings of the present invention. Referring now to the drawings wherein like reference numerals designate like elements throughout.

One aspect of the present invention comprises utilization of a laser-based projector in place of conventionally illuminated CRT, LCD, DMD or light valve projectors. Laser-based projectors have greatly expanded focal ranges as compared to such conventional light projectors. For a prototype laser projection system, the laser has a focal depth range of approximately two (2) feet. This means, for example, when using an initial ten (10) foot throw distance, it is possible to move a display panel anywhere between nine (9) and eleven (11) feet from the laser-based projector and still maintain a focused image at all points on the display panel. This advantage is achieved with no cost penalties for specialized optics that would otherwise be necessary when employing a conventional, non-laser projection system.

Figure 1:
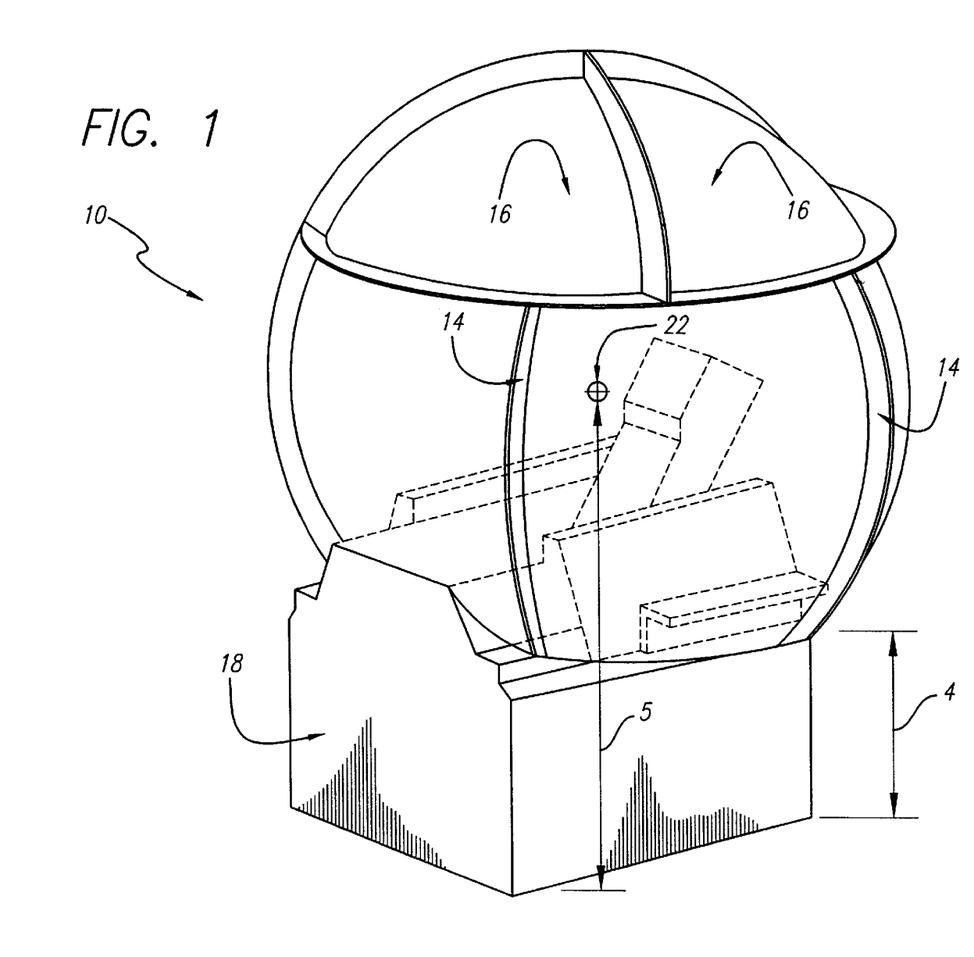
FIG. 1 is a front cut-out view of a curved surface, rear-projection dome display system formed in accordance with the present invention.
Figure 6:
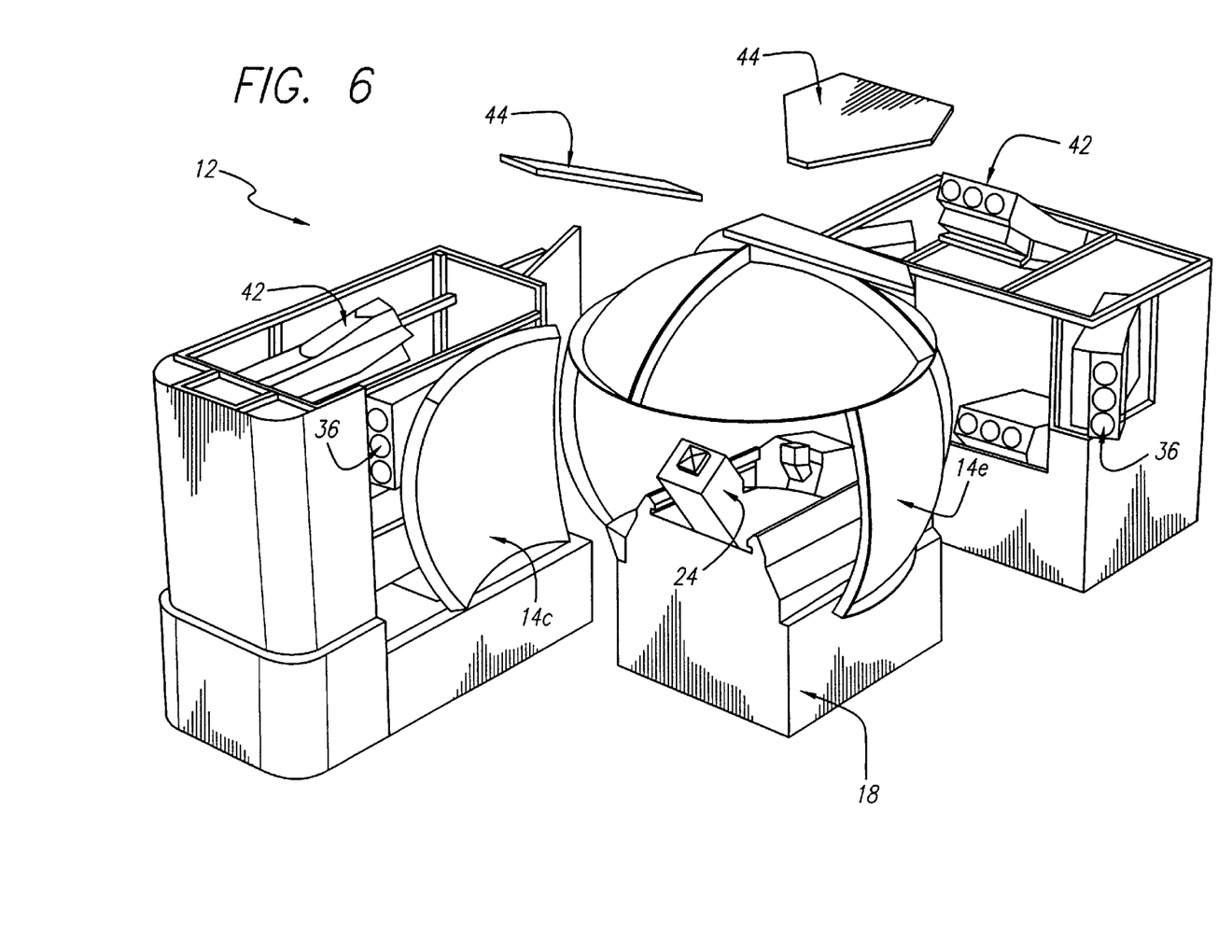
FIG. 6 is a perspective view of the display system formed in accordance with the present invention wherein the panels are removed for viewing inside the dome.

A spherical display dome formed in accordance with the present invention is shown at 10 in FIG. 1. Display dome 10 can be used in a number of applications such as military and civilian simulation systems and commercial entertainment applications. The diameter of dome 10 may vary depending on the application, for example, the type and size of aircraft cockpit to be simulated. As best shown in FIG. 6, display dome 10 includes a plurality of separate panels forming a curved surface, real image display assembly 12 including at least one rear-projector for each curved panel.

Figure 2:
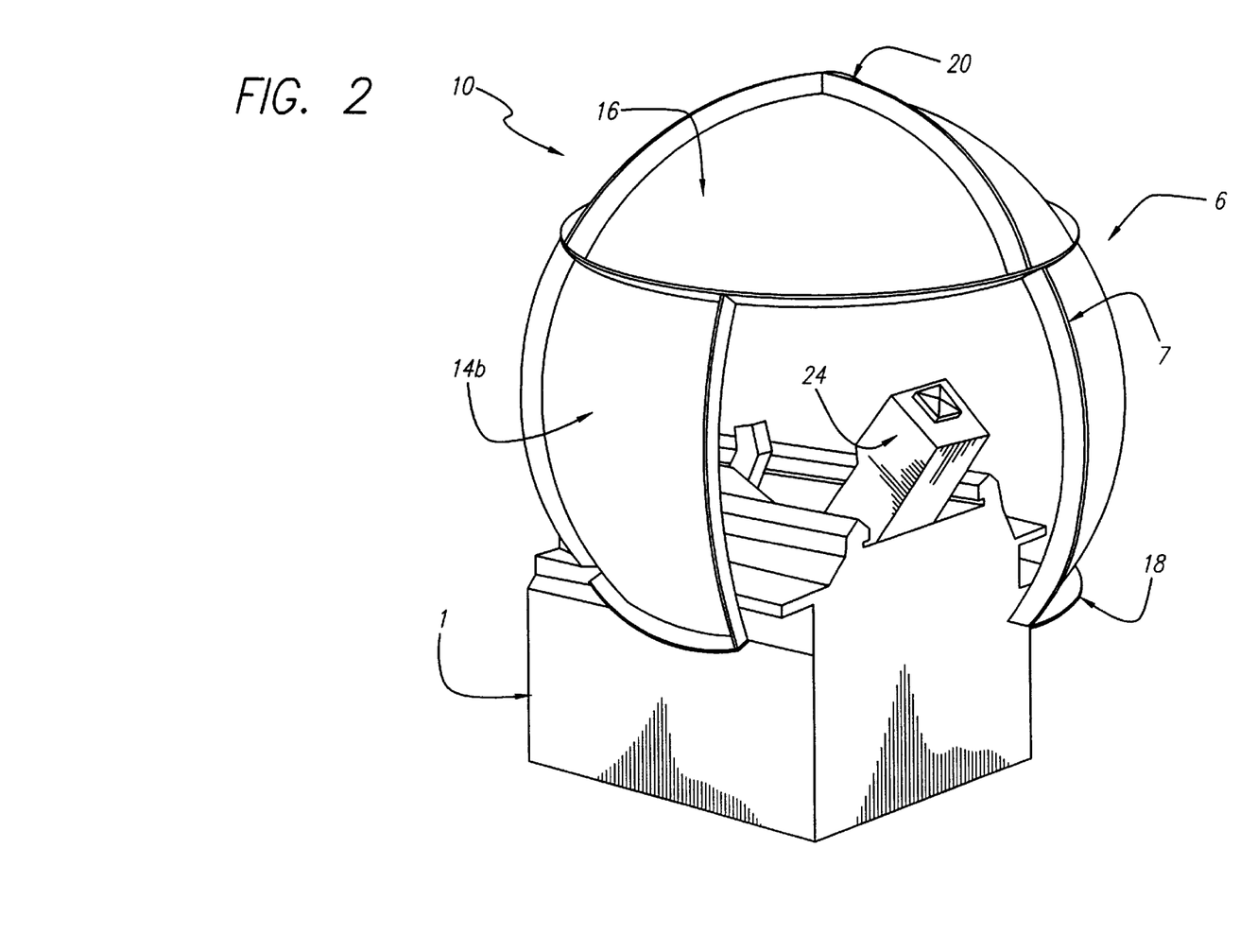
FIG. 2 is a left rear view of the dome formed in accordance with the present invention, wherein one of the side panels is removed to allow viewing of the dome interior.

Turning to FIGS. 1 and 2, display dome 10 is formed from a plurality of separate panel members. Preferably, five (5) side panels 14 and three (3) cap panel members 16 are employed. Each of the side panels 14 is of similar curved shape and size. When positioned side-by-side, side panels 14 form a substantially cylindrically-shaped, hollow member open at either end. Curved side panels 14 are preferably supported on a cockpit simulator 18 having a forward panel 14a of similar contour to an aircraft cockpit. The specific details of simulator 18 make up no part of the present invention. The three cap panel members 16 are of similar size and curved shape. When positioned end-to-end on top of panels 14, cap panels 16 form a hemispherically-shaped member that, when combined with panels 14, form display dome 10.

The three similar cap panels 16 are wedge-shaped and intersect one another at the upper pole 20 of display dome 10. As viewed from the system design eye point 22 located with dome 10, each side panel provides substantially 72° horizontal FOV and a vertical FOV of substantially 30° in an upwardly direction and substantially 40° in a downwardly direction, comprising a total vertical FOV of substantially 70°. From the design eye point 22, each of the cap panels 16 provides substantially 120° horizontal FOV and substantially 60° vertical FOV. The combined vertical FOV for the side and cap panels is substantially 130°.

Figure 4A:
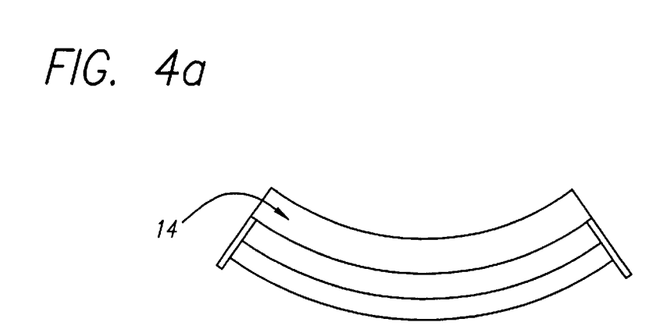
FIGS. 4a, 4b and 4c depict top, front and side views, respectively, of a side panel formed in accordance with the present invention.
Figure 4B:
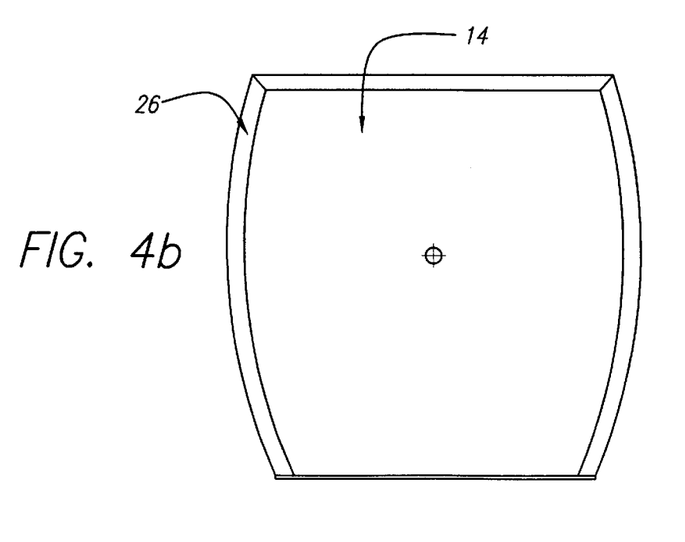
Figure 4C:
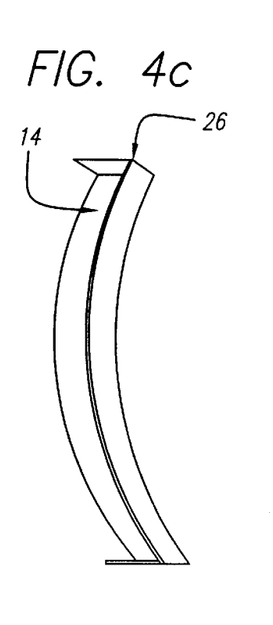
Figure 5A:
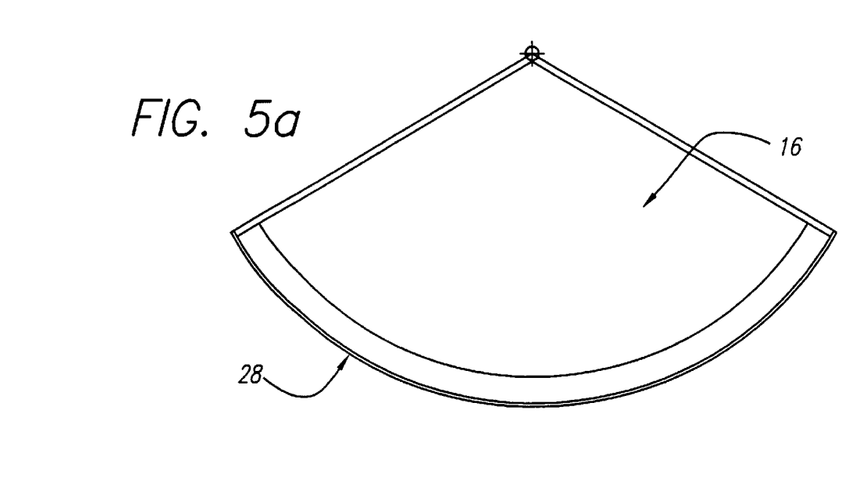
FIGS. 5a, 5b and 5c depict top, front and side views, respectively, of a cap panel formed in accordance with the present invention.
Figure 5B:
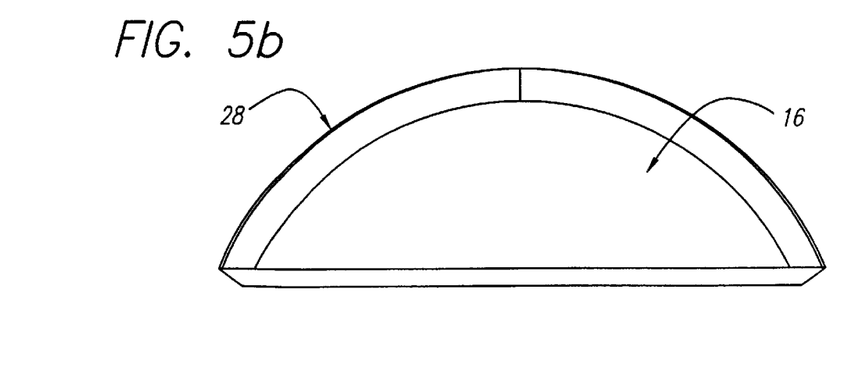
Figure 5C:
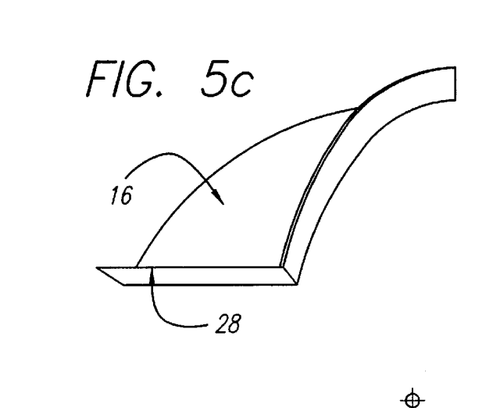

The side panel 14 located directly in front of the simulator seat 24 serves as a front display screen for dome assembly 10 and is preferably cut to the match the cockpit shape of front surface 19 of simulator 18. The interior surfaces of the remaining side panels 14 as well as the interior surfaces of the cap panels 16 each serve as a display screen for displaying an image provided by one of the rear projectors as will be explained. As shown in FIGS. 4 and 5, respectively, each of the side panels 14 includes a molded flange portion 26 forming an outer edge extending completely around the panel. Likewise, each of the cap panels 16 includes a molded flange portion 28 forming an outer edge extending completely around the panel. When the side panels 14 are assembled to form the cylindrically-shaped hollow member, the flanges 26 of adjacently disposed panels make surface contact with one another. In a similar manner, when cap panels 16 are positioned adjacent one another and adjacent the side panels 14 to form dome 10, flanges 28 of adjacent cap panels 16 make surface contact with one another. In addition, the flanges 28 of cap panels 16 disposed adjacent the side panels 14 make surface contact with flanges 26.

Once the side and cap panels 14 and 16, respectively, are assembled, the abutting flanges 26 and 28 of adjacent panels may be secured by any conventional fastening assembly. For example, bolts may be extended through aligned openings formed in the flanges 26 and 28. Alternatively, clamps may straddle each flange and serve to press the flanges into contact with one another. Regardless of how flanges 26 and 28 are secured, the geometry of flanges 26 and 28 is such that they do not interfere with the light path of the rear-projection image display system as will become clear.

For the dome shown in FIG. 1, the design eye point 22 of the curved surface, real image, rear-projection display system is located at the center of spherical dome 10. The interior diameter of dome 10 is considered a design choice. In a preferred embodiment shown in FIG. 1, the diameter is chosen to be 97 inches. It provides an eye relief of 48 ½ inches from eye point 22 to all points on the interior display surfaces of panels 14 and 16. The three cap panels 16, when assembled on side panels 14 will have an outer radius of about 45 ¾ inches, including the mounting flanges 26 and 28. At its highest point, the intersection 20 of cap panels 16 is located substantially 28 ¾ inches above the top of side panels 14. Each cap panel 16 provides a substantially 120° azimuth viewing angle, as referenced from the design eye point 22.

Only one mold is necessary to fabricate the three (3) similarly-shaped cap panel members 16. Likewise, only one mold is necessary to fabricate the five (5) similarly-shaped side panel members 14. All of the panels are formed of a translucent substrate, with appropriate optical characteristics that allow the panels to function as concave shaped display screens capable of receiving and displaying images projected from a plurality of rear-projection assemblies. As shown in FIGS. 4 and 5, the flanges 26 and 28 extending in a direction substantially perpendicular to their attached panel. All of the flanges are substantially four (4) inches wide and are integrally molded along with their attached panel 14 or 16, respectively.

When dome 10 is employed as an aircraft simulator, the simulator 18 is positioned within dome 10 such that the eye of the person seated in simulator 18 coincides with design eye point 22 of dome 10. This is achieved by adjusting the elevation of simulator 18 until the design eye point 22 coincides with the cockpit eye point. Within limits of the display system 12, the only change to simulate different cockpits is the display system elevation and the specific cut-out of the panels to achieve a match with the contour of the cockpit to be simulated.

Figure 3:
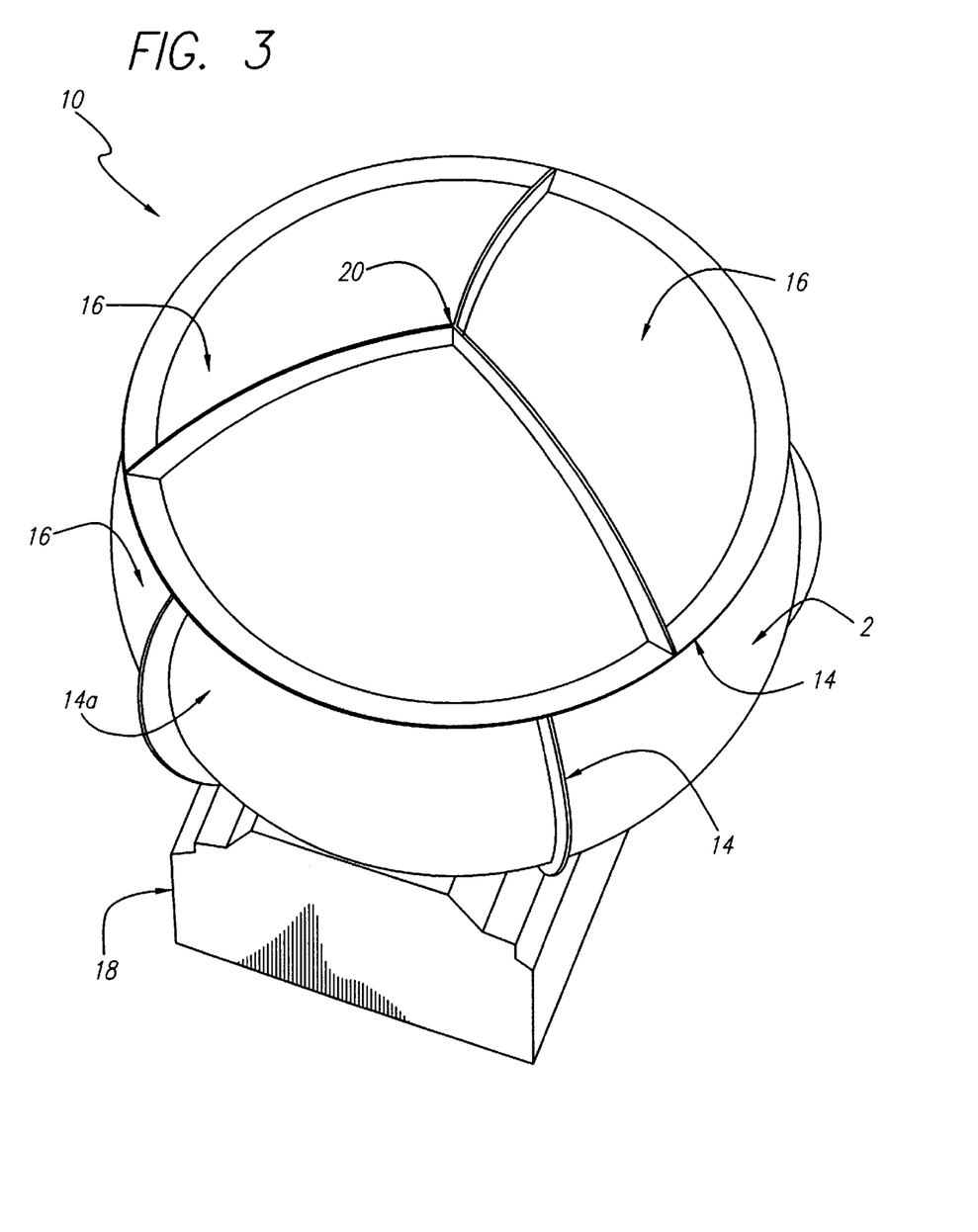
FIG. 3 is a perspective view of the dome formed in accordance with the present invention, illustrating the arrangement of side and cap panels.

As shown in FIGS. 2, 3 and 4, panels 14 and 16 are shaped so that the intersection between adjacent panels do not interfere with significant training requirements of high-speed fighter aircraft. In particular, the front panel display screen 14a, has a relatively wide horizontal FOV of 72°. There are no abutments obscuring the view from the design eye point 22 created by adjacent panel flanges within the primary forward area of interest or at the three (3) o'clock and nine (9) o'clock wing locations. The specific placement of the boundaries for the upper, forward cap display screens is such that there is minimal interference with air refueling training operations. The intersection pole 20 of the three cap panels 16 is designed to be directly above the design eye point 22, an area normally not in the pilot's line of sight.

As shown in FIG. 2, the dome 10 has a left rear side panel removed. In normal operation, the missing panel along with the right real side panel will be hinged to allow sufficient pivoting movement of the panels to allow a subject to enter or exit simulator 18. A conventional hinge mechanism is mounted on each of two fixed position side panels 14b and 14e, allowing the other two panels, including panel 14c shown in FIG. 6, to pivot out of contact with one another.

Figure 7:
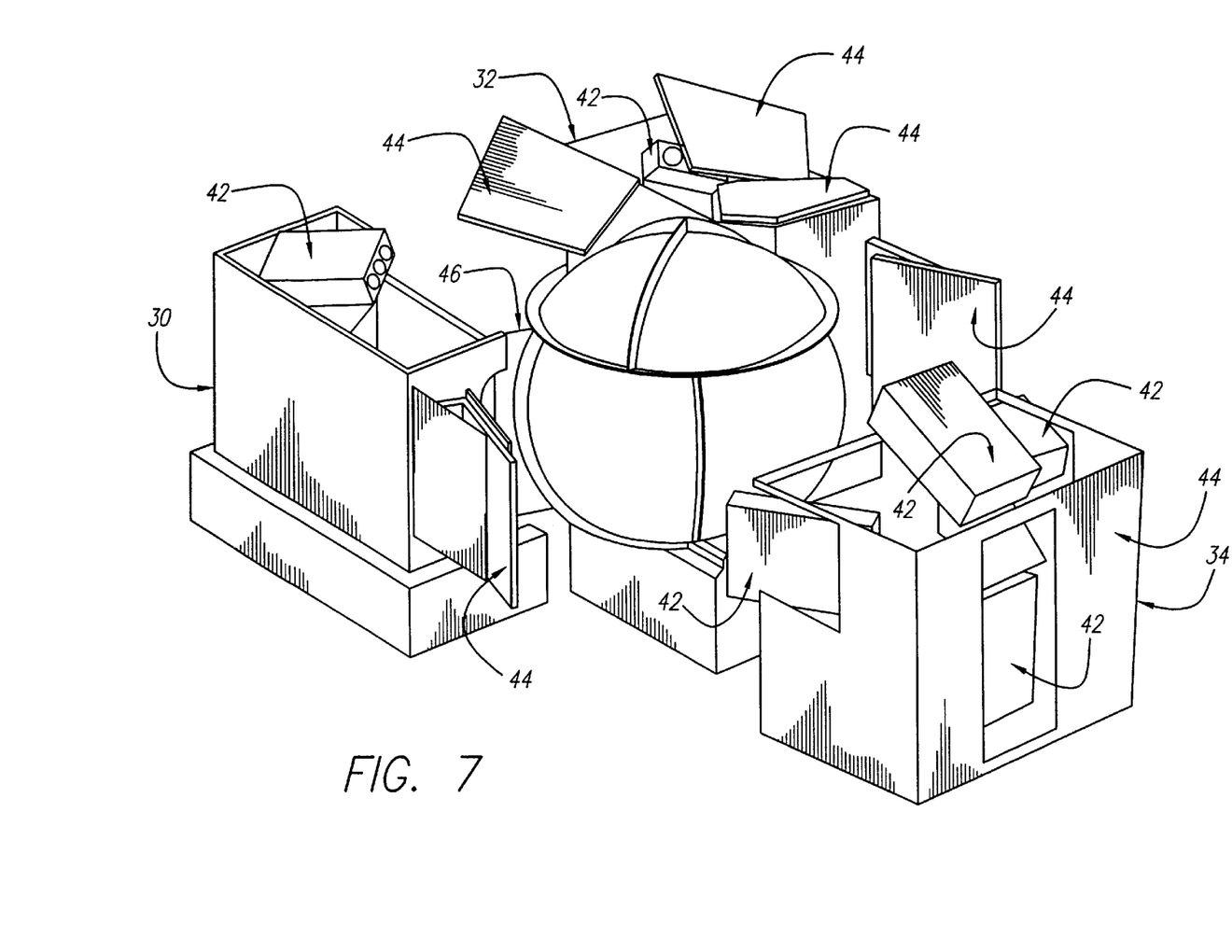
FIG. 7 is a perspective view of the dome display system including supporting structure formed in accordance with the present invention.

The display system 12 in FIG. 7 includes a plurality of three support towers 30, 32 and 34, respectively. Tower 32 is located adjacent the right rear portion of dome 10, while tower 32 is located adjacent the left rear portion of dome 10 and tower 34 is positioned adjacent the front of dome 10. The flanges 26 and 28 located between the side and cap panels as well as the flanges 26 located between side panels 14 and simulator 18 may be used as attachment points for mounting dome 10 to the rear towers 30 and 32. It is noted that the flanges also serve to provide an attachment point of affixing light baffles used to prevent projected stray light from spilling into adjacent screens.

The rear towers 30 and 32 may each contain two (2) laser-based projector assemblies 36 and 38 and a fold mirror as shown in FIG. 7. The front tower 34 contains the remaining four (4) laser-based projector assembly 42. The towers 30, 32 and 34 preferably have wheels, allowing them to be rolled into place during initial assembly of imaging system 12. After the towers 30 32 and 34 have been properly positioned, adjustable leveling pads, not shown, are employed to assure that all the towers are level relative to one another and are set at the correct height. To reduce the overall size of display imaging system 12, the projected images are reflected to the display surface by fold mirrors 44 mounted on the towers. The front tower 34 optionally may house a heads-up-display (HUD) projector. The structure of dome 10 is supported above simulator 18 by means of steel sheets 46 which are extend between and are attached to the rear towers 30 and 32 and the bottom flanges 26 of side panels 14. Support columns, not shown, are preferably positioned between the bottom flanges 26 of the two side panels 14a and 14b located at the forward portion of dome 10 and the floor, for providing support for the front portion of dome 10.

At least one laser-based projector is employed for each of the eight side and cap panels 14 and 16, respectively. A separate HUD projector may be employed, or the HUD graphics may be embedded in the video of the forward panel 14a laser projector. It will be necessary for the system imaging generator to have image distortion correction capability to compensate for the curvature of the side and cap panel display screens.

Thus, the present invention has been described herein with reference to a particular embodiment for a particular application. Those having ordinary skill in the art and access to the present teachings will recognize additional modifications, applications and embodiments within the scope thereof. While the preferred embodiment employs five (5) side panels, it is considered within the scope of the present invention to have a greater or lesser number of side panels depending on the particular FOV and the location of the flange abutments therein. In a similar manner, the preferred use of three (3) cap sections may be increased or decreased depending on the ultimate use of the dome assembly 10. The number of support towers may be altered and their location changed as required. While at least one laser-based projector for each display panel is considered to provide the best obtainable image, the number of projectors may be altered for specific applications.

It is therefore intended by the appended claims to cover any and all such applications, modifications and embodiments within the scope of the present invention.

Accordingly,

What is claimed is:

1. An improved image projection system, comprising:
    a plurality of translucent panel members having curved configurations positioned adjacent one another to form a display dome assembly with a design eye point located within the dome;

each of the panel members having a concave inner surface facing toward an interior portion of the display dome, with each concave inner surface having an optical medium creating a diffusion surface for displaying a visual image to the design eye point; and at least one laser-based rear projector capable of projecting a visual image on and through each of the panel members, thereby providing a continuous, real image to the location of the design eye point.

2. The image projection system of claim 1, wherein five side panel members of similar shape and sized are positioned adjacent to one another to form a substantially cylindrically-shaped intermediate portion of the display dome.

3. The image projection system of claim 2, wherein three cap panel members of similar shape and size are mounted on the five side panel members and form a substantially hemispherically-shaped upper end portion of the display dome.

4. The image projection system of claim 1, wherein the display dome is supported on a simulator assembly.

5. The image projection system of claim 1, wherein each of the panel members is formed with an outer edge including a flange portion extending a direction substantially perpendicular to the panel member.

6. The image projection system of claim 5, wherein the flange portions of adjacent panel members make surface contact with one another when the panel members are arranged to form the display dome.

7. The image projection system of claim 1, wherein a plurality of support towers are disposed adjacent the display dome, with each tower providing support for at least one laser-based rear projector aimed at one of the panel members.

8. The image projection system of claim 1, wherein at least one folded mirror is positioned to reflect the image from one of the laser-based rear projectors to one of the panel members.

\* \* \* \* \*